United States Patent [19]

Deproux

[11] 4,345,260

[45] Aug. 17, 1982

[54] INK JET PRINTER WITH CARRIAGE VELOCITY COMPENSATION

[75] Inventor: Jacques Deproux, Sevres, France

[73] Assignee: Compagnie Internationale pour l'Informatique CII-Honeywell Bull (Societe Anonyme), Paris, France

[21] Appl. No.: 193,820

[22] Filed: Oct. 3, 1980

[30] Foreign Application Priority Data

Mar. 13, 1980 [FR] France ............................... 80 05674

[51] Int. Cl.[3] ............................................ G01D 15/18
[52] U.S. Cl. ................................... 346/75; 346/140 R
[58] Field of Search .............................. 346/75, 140 IJ

[56] References Cited

U.S. PATENT DOCUMENTS 3,877,036 4/1975 Loeffler et al. ....................... 346/75

FOREIGN PATENT DOCUMENTS 4737 10/1979 European Pat. Off. .
2549758 5/1977 Fed. Rep. of Germany .

OTHER PUBLICATIONS

Iwasaki, K., Ink Jet Printer, Patents Abstracts of Japan, vol. 3, No. 61, May 26, 1979, p. 110E113 and Application No. 54-40637.
Isayama, T., Ink Jet Printer, Patents Abstracts of Japan, vol. 3, No. 119, Oct. 6, 1979, p. 86E142 and Application No. 54-97024.
Iwasaki, K., Ink Jet Recorder, Patents Abstracts of Japan, vol. 2, No. 115, Sep. 25, 1978, p. 6046E78 and Application No. 53-79537.
Fowler, R. L., Dual Nozzle Ink Jet Printer, IBM Technical Disclosure Bulletin, vol. 18, No. 2, Jul. 1975, pp. 448-449.
Kiyogora, H., Recording Head, Patents Abstracts of Japan, vol. 3, No. 150, Dec. 11, 1979, p. 162E158 and Application No. 54-131934.

*Primary Examiner*—George H. Miller, Jr.
*Attorney, Agent, or Firm*—Kerkam, Stowell, Kondracki & Clarke

[57] ABSTRACT

The invention relates to a recording or printing device utilizing a jet of liquid, which device comprises a carriage which may be displaced in a direction of movement parallel to the printing medium. This carriage carries a nozzle which discharges a jet of ink which is divided into a series of droplets, the dots formed by the impingement of these droplets on the printing medium making it possible to obtain images formed by dot. In order to avoid smearing of the image formed by the dots several techniques are disclosed which compensate for the relative movement between the carriage and the paper or printing medium, thereby making the path of the droplets more nearly perpendicular to the paper. In one embodiment, for example, the carriage carries electrodes which have the role of deflecting the orientation of the jet of liquid dispatched by the nozzle, in the opposite direction to that of the movement of the carriage.

6 Claims, 7 Drawing Figures

INK JET PRINTER WITH CARRIAGE VELOCITY COMPENSATION

BACKGROUND OF THE INVENTION

1. Field of the Invention

The present invention relates to a device utilizing a jet of liquid and more particularly a recording or printing device in which selectively charged ink droplets are flung towards a suitable record carrier such as a sheet of paper.

2. Description of the Prior Art

Printing devices are known, in which conductive ink under pressure is fed to a small size nozzle and emerges from this nozzle in the form of a jet of ink which, because of instabilities due to the surface tensions exerted at its surface, is divided into a series of droplets. By means of a transducer which causes the nozzle to be placed in oscillation in a direction parallel to the direction of the jet, droplets are obtained of which the diameter and spacing are uniform. These droplets are flung towards a record carrier or printing medium, and are deflected during their travel so that upon impinging on this surface, they form sets of dots which represent letters, numerals or in more generalized manner, some form of symbols.

In particular printing devices of this type, for example are described and illustrated in French Pat. No. 2,204,149. The ink droplets are generated by means of a single nozzle which is moved with respect to the record carrier in a continuous manner along a direction parallel to the lines of the characters which are to be printed. In these devices, the impression of each character is obtained by deflecting the droplets which are sprayed by this nozzle in a direction at right angles to that of the relative movement of the nozzle, this deflection being performed in repetitive manner during this relative movement. To this end, a charging electrode situated close to the point at which the ink jet issuing from the nozzle is divided into droplets, selectively applies an electrostatic charge to each droplet upon being formed, the magnitude of this charge being a direct function of the voltage of the control signal applied to the charging electrode. Only the droplets needed for printing characters are charged in this manner, whereas those not required for printing are not charged. All these droplets then pass through a constant electrical field generated by two deflecting plates between which is maintained a comparatively high difference in potential, this field being aligned in a difference at right angles to that of the discharge from the nozzle. This has the result that the charged droplets which are needed for printing the characters, are deflected in the direction of this field, and reach the record carrier to form the required character on the same, the magnitude of this deflection being a function of the charge borne by each of the droplets. By contrast, the uncharged droplets which are not needed for printing, are not deflected and are then collected by a trough towards which they are directed. However, although the droplets generated by the nozzle are flung at a speed $V_L$ in a direction at right angles to the surface of the record carrier, the nozzle imparts a complementary speed $V_G$ to each of these droplets as a result of its movement with respect to this carrier. The speed $V_G$ acting in alignment with the direction of movement of the nozzle, that is to say at right angles to the direction of discharge of the droplets. By reason of the combined action of these two speeds $V_L$ and $V_G$, each droplet follows a path contained in a plane which is not at right angles to the surface of the record carrier. In view of this fact, the droplets which are dispatched towards the record carrier reach the latter at an angle of inclination such that they are spread out upon striking, each forming an elongated spot of substantially elliptical shape. The letters formed by the totality of these spots then have a blurred appearance which greatly impairs their legibility. This phenomenon, which is appreciable primarily in the direction of the movement of the nozzle, is the more intensive as the droplets are coarser and the higher the ratio is between the speed $V_G$ of relative displacement of the nozzle and the speed $V_L$ at which the droplets are propelled. In the prior printing devices, this ratio was comparatively low, so that the droplets underwent practically no spreading upon striking the record carrier. However, in the printing devices produced at present, it has been attempted to raise the speed $V_G$ of movement of the nozzle in order to increase the rate of printing characters, so that the phenomenon of spreading of the droplets become particularly troublesome.

The present invention seeks to eliminate this disadvantage and provides a recording device utilizing a jet of liquid, in which the spots formed when the droplets of liquid strike the record carrier remain practically circular.

SUMMARY OF THE INVENTION

The invention provides a printing device utilizing a jet of liquid, which comprises at least one liquid droplet generator equipped with a liquid discharge orifice and arranged to discharge along a direction of ejection, a succession of droplets of liquid towards a record carrier, and a driving device assuring a relative movement between the generator and the record carrier along a predetermined direction of displacement parallel to the record carrier or paper surface. To maintain the liquid spots circular in spite of a relatively high $V_G$, the said recording device includes means of modifying the direction of ink discharge or spray in the direction opposite to that of the relative movement of the said generator. The direction of discharge or ejection together with the plane passing through the said discharge orifice which is perpendicular to the said direction of movement forms an angle $\theta$, the value of this angle being defined by the relationship:

$$\tan\theta=(V_G/V_L)$$

in which $V_G$ represents the speed of relative movement of the generator and $V_L$ represents the speed at which the liquid is discharged through the discharge orifice of the said generator.

BRIEF DESCRIPTION OF THE DRAWINGS

In order that the invention may be more fully understood, reference will now be made, by way of nonliminting example, to the accompanying drawings, in which.

DESCRIPTION OF THE PREFERRED EMBODIMENTS

Figure 1:
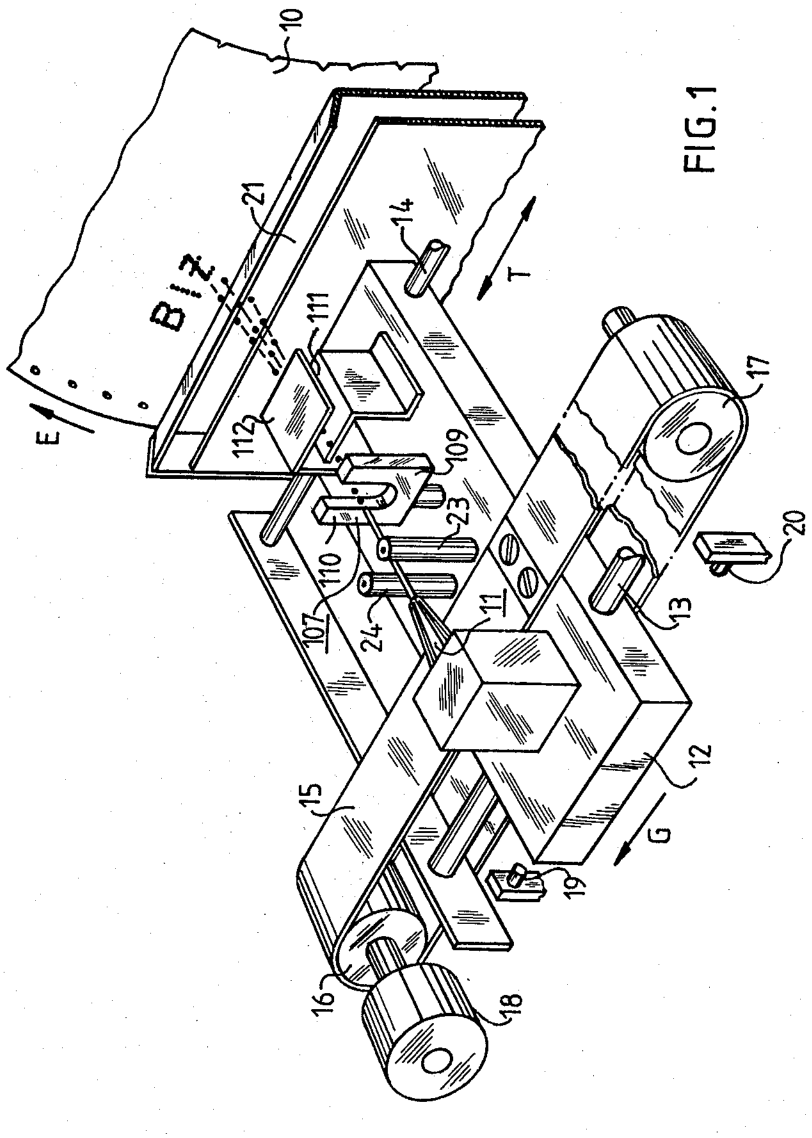
FIG. 1 is a diagrammatic perspective view showing an ink jet printing machine in accordance with one embodiment of the invention.

The printing machine which is illustrated in FIG. 1 is a series printer which, by means of droplets of ink discharged towards a record carrier formed by a sheet 10 of paper, makes it possible to obtain on this carrier groups of dots representing characters, or in more generalized manner, any form of symbols. Let it be assumed that at the end of producing the imprint of a line of characters, this sheet 10 is moving vertically in the direction of the arrow E, by means of a driving device of known type (not illustrated) in order to bring into the printing position the part of this sheet on which the following line of characters is to be printed.

The printing machine shown in FIG. 1 comprises an ink droplet generator 11 installed on a carriage 12 which may slide on two horizontal guiding rods 13 and 14 connected to the machine frame. These guiding rods are arranged in such a manner as to permit the carriage 12 to be displaced along the sheet 10 according to a direction of movement T perpendicular to the direction of movement E of the sheet 10. The movement of the carriage 12 in the direction T is effected by means of a belt 15 which is secured on the carriage 12 and which is tensioned over two rollers 16 and 17 of which the one 15 is coupled to the output shaft of an electric motor 18 and of which the other 17 is a tensioning roller. In the example described, the electric motor 18 is arranged to displace the carriage 12 at a practically constant speed, alternately in one direction and then in the other, along a direction T. To this end, the printing machine is provided with two spring contact switches 19 and 20 which, being situated respectively at each of the terminal positions of the stroke of the carriage 12, make it possible to control the reversal of the direction of rotation of the motor 18, the switch contact 19 being operated every time the carriage 12 reaches it left-hand terminal position and the switch contact 20 being operated every time this carriage reaches its right-hand terminal position.

The ink droplet generator 11 which is installed on the carriage 12 is connected, in known manner, to an ink feed mechanism (not illustrated) having the task of supplying ink under pressure to the droplet generator 11. This generator 11 which is of known type, will not be described in detail because its structure is analogous to that which has been described and illustrated in the French patent application filed by the applicants on Dec. 29, 1978 under No. 78.36984 published under the No. 2,445,229, corresponding to U.S. patent application Ser. No. 096,527, filed Nov. 21, 1979, now U.S. Pat. No. 4,290,074 and assigned to the assignee of the present invention. It will simply be stated that, as is apparent from FIG. 7, this droplet generator comprises a mechanical vibration amplifier 100, traversed by a central passage connected to an ink feed tube 101 which is, itself connected to the aforesaid ink feed mechanism. The ink which is supplied to the droplet generator under pressure emerges through the orifice 102 of the mechanical amplifier 100 in the form of a continuous jet 103. This droplet generator moreover comprises an electromechanical conversion device which is secured firmly against the mechanical amplifier 100 and which is formed by two annular discs 104 and 105 of piezoelectrical crystal these discs clamping between them a thin circular metal element 106. The tube 101 which is of metal, is connected to one of the two terminals of a source of variable electrical voltage 115, whereas the other terminal of this source is connected to the metal element 106. The piezoelectric crystal discs 104 and 105 are thus energized by the variable voltage of the particular frequency which is supplied by this source 115. Consequently, these discs 104 and 105 vibrate and the vibrations they generate, transmitted to the amplifier 100, cause the interruption, at a small distance from the orifice 102, of the jet of ink into a series of droplets 108 which are of identical size and evenly spaced apart from each other.

Reverting to FIG. 1, it can be seen that the carriage 12 has installed on it a charging electrode 107 comprising two vertical branches 109 and 110 positioned, respectively, to the right and left of the jet of ink 108. It should be noted however that the shape of the charging electrode 107 is not particular to the invention and that this electrode could equally well be an annular electrode. The carriage 12 also carries two deflector plates 111 and 112 which are positioned horizontally to either side of the path followed by the droplets 108.

Figure 7:
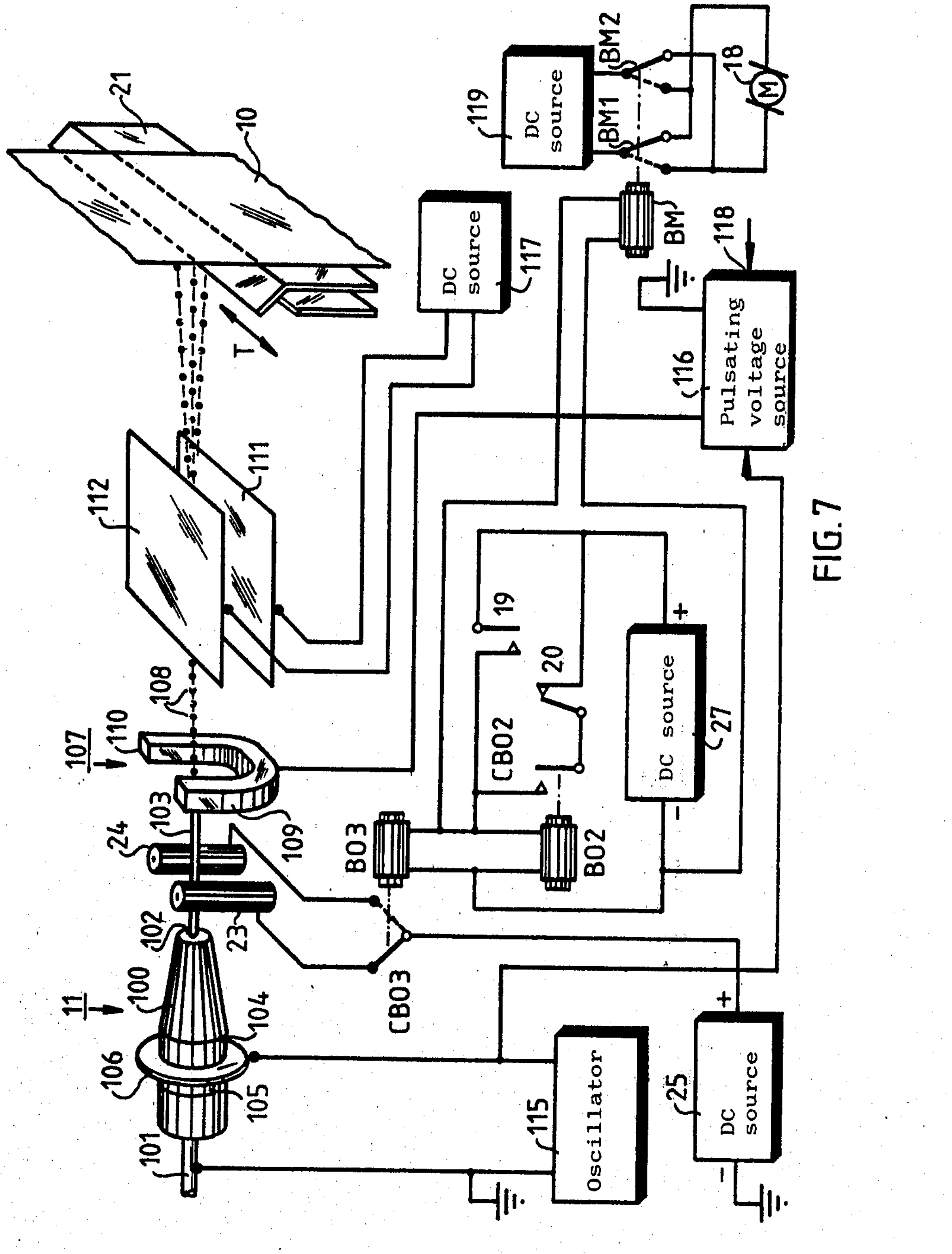
FIG. 7 illustrates an electrical lay-out applicable to the printing machine of FIG. 1, in combination with a fourth embodiment of the means utilized to deflect the direction of ejection of the jet of ink.

FIG. 7 shows that the charging electrode 107 is energized by a pulsating voltage of determined amplitude, supplied in synchronism with the vibration frequency of the droplet generator by a voltage source 116, this source on the one hand receiving the variable electrical voltage supplied by the source 115, and on the other hand, via its input 118, receiving binary signals corresponding to the different points of the matrix of dots constituting a character which is to be printed on the sheet 10. Thus, as each droplet is formed, the charging electrode 107 induces an electrical charge in this droplet whose value depends on the potential to which this electrode 107 is raised. In this manner, droplets are charged selectively. It is necessary to point out at this juncture that only the droplets which are needed to print the characters are charged, whereas those which are unnecessary for this printing operation are not charged. All these droplets then pass between the two deflector plates 111 and 112 which, as is apparent from FIG. 7, are connected respectively to the two terminals of a source of direct voltage 117. Because of this, the ink droplets which were charged by the charging electrode 107, are deflected electrostatically along a direction at right angles to the direction of movement T and then pass over a recuperator device 21 and finally reach the sheet 10 of paper. By contrast, the ink droplets which are not charged are not deflected upon passing between the deflector plates 111 and 112, so that these droplets continue their rectilinear movement and reach the trough or recuperator device 21 in which they are collected. The ink collected by the recuperator device 21 is then returned to the ink supply mechanism.

In the printing machine which is illustrated in FIG. 1, the reciprocating movement of the carriage 12 in the direction of displacement T is controlled by the two switching contacts 19 and 20, the contact 19 normally being open whereas the contact 20 is normally closed. If reference is made to FIG. 7, it is apparent that the reversal of the direction of rotation of the motor 18 (and consequently of the displacement of the carriage 12) is obtained by the switching of two reversing contacts BM1 and BM2 under the control of a relay coil BM. The motor 18 being supplied by a source of direct voltage 119 via the contacts BM1 and BM2, it will be assumed that when these contacts BM1 and BM2 are in the position shown in FIG. 7, the motor 18 turns in a direction such that the carriage 12 is moving from the right towards the left, that is to say in the direction denoted by the arrow G in FIG. 1. This movement continues until the instant in which the carriage 12, upon reaching its left-hand limit position, closes the contact 19. At his particular instant, a direct current flows from the (+) terminal of a d:c. source 27, via the closed contact 19, and energizes the relay coil BM as well as two other relay coils BO2 and BO3. Upon being energized, the coil BO2 closes its contact CBO2 and thus establishes a hold for itself and for the coils BM and BO3. Upon being energized, the coil BM switches its reversing contacts BM1 and BM2 which causes the reversal of the direction of rotation of the motor 18. In view of this fact, the carriage 12 is displaced towards the right and, after having departed from its left-hand limit position, stops holding the contact 19 closed. However, the coils BO2, BO3 and BM remain energized because the contacts 20 and CBO2 are closed. The movement towards the right of the carriage 12 continues until the instant at which this carriage, upon arrival at its right-hand limit position, opens the contact 20. At this particular instant, the opening of the contact 20 has the result that the coils BO2, BO3 and BM are de-energized. Being de-energized, the coil BO2 opens its contact CBO2. The de-energized coil BM because its reversing contacts BM1 and BM2 to switch to the position shown in FIG. 7, so that the carriage 12 is again moving towards the left. This carriage, upon leaving its right-hand terminal position, stops keeping the contact 20 open. The contact 19 and CBO2 now being open, the coils BM, BO2, and BO3 cannot however be energized again upon reclosing the contact 20, this renewed energization not being possible before the carriage 12 reaches its left-hand terminal position.

FIG. 1 also shows that the carriage 12 has mounted on it two vertical electrodes 23 and 24, situated at either side of the jet of ink 103, between the droplet generator 11 and the charging electrode 107. These two electrodes 23 and 24 which have the task of altering the direction of the jet of ink 103 along a horizontal plane, are connected selectively as shown by FIG. 7, to the positive terminal of a source of direct voltage 25, via a reversing contact CBO3 controlled by the relay coil BO3. The negative terminal of this source 25 is placed at the same potential as that of the ink supply tube 101. If the coil BO3 is not energized, that is to say if the contact CBO3 is at the position shown in FIG. 7, the electrode 23 is brought to a positive potential and thus attracts the jet of ink 103 which is then deflected towards the right. By contrast, if the coil BO3 is energized, the contact CBO3 is at its other position, so that the electrode 24 is brought to a positive potential and that the jet of ink 103 is deflected towards the left. The position of the contact CBO3 shown in FIG. 7 corresponds to the case in which the carriage 12 is displaced towards the left. As stated in the foregoing, the energization and de-energization of the coil BO3 are controlled in the same manner as those of the coil BM. In these circumstances, when the coils BM and BO3 are de-energized, that is to say when the carriage 12 is displaced towards the left, the jet of ink 103 is deflected towards the right. By contrast, when these coils BM and BO3 are energized, that is to say when the carriage 12 is displaced towards the right, the jet of ink 103 is deflected towards the left. In other words, the jet of ink 103 is deflected in the direction opposite to that of the direction of movement of the carriage 12.

Compensating for the movement of carriage 12 with respect to paper 10 by adjusting the jet of ink 103 may be obtained in a different manner from that which has been shown in FIG. 7. Thus, in the embodiment illustrated in FIG. 4, this compensation is obtained by mounting the droplet generator 11 in such manner that it may pivot around a vertical spindle 30 mounted on the carriage 12. The pivoting of the generator 11 around the spindle 30 is controlled by means of an actuating device which is, in the present case, an electromagnet 31. Electromagnet 31 acts via a lever 32 pivoted around a vertical spindle 33 attached to the carriage 12. The lever 32 comprising two arms of which the one 34 is coupled to the generator 11 by means of a small connecting rod 35. The other arm 36 is equiped with a hinging block 37 which, being connected to the movable armature of the electromagnet 31 via a small connecting rod 38, may be displaced along the arm 36 by means of an adjusting screw 39. By acting on this screw 39, the machine operator may thus cause an alteration, to a definite extent, of the angular displacement imposed on the generator 11 when it is actuated by the electromagnet 31. The position occupied by this generator 11 when the carriage 12 is moving from the right towards the left (direction of the arrow G) has been illustrated by solid lines in FIG. 4, whereas the dash-dotted lines show the position it occupies when this carriage is moving from the left towards the right (direction of the arrow D). Also illustrated are the two directions LG and LD along which the jet of ink is ejected by the generator 11 when this generator is situated in one or other of its two positions. The direction LG corresponds to the case in which the carriage 12 is displaced in the direction of the arrow G and the direction LD corresponds to the case in which the carriage is displaced in the direction of the arrow D.

Figure 5:
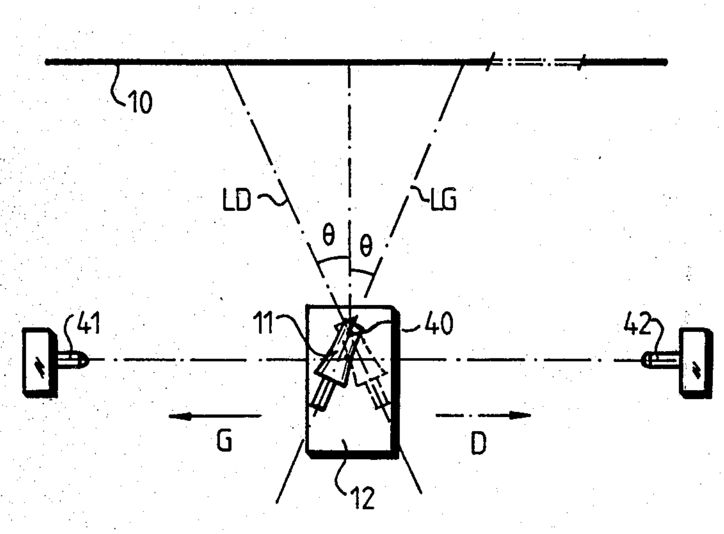
FIG. 5 illustrates a second embodiment of the means utilized to deflect the direction of ejection of the jet of ink.

In the embodiment illustrated in FIG. 5, the droplet generator 11 is pivoted around a vertical spindle 40 carried by the carriage 12, this joint being established with a very close tolerance or tight fit to enable the generator 11 to remain in a steady position absent an applied force. Moreover, the printing machine is provided with two stops 41 and 42 situated each at the respective extremity of the path followed by the generator 11 during the reciprocating movements of the carriage 12. It will be observed that when the carriage 12 is displaced towards the left, that is to say in the direction of the arrow G, the generator 11 is placed in the position illustrated in FIG. 5. The jet of ink dispatched by the generator 11 is then aligned along the direction LG. This generator comes into contact with the stop 41 a little before the carriage 12 reaches its left-hand terminal position. From this instant, the generator 11, during the movement performed by this carriage to reach this left-hand terminal position, is thrust back by the stop 41 and then occupies the position illustrated by dash-dotted lines in FIG. 5, the jet of ink dispatched by this generator consequently being aligned in the direction LD. The generator 11 retains this position until, during the movement towards the right of the carriage 12 (direction of the arrow D), it comes into contact with the stop 42, this establishment of contact occurring a little before the carriage reaches its right-hand terminal position. From this instant, during the movement performed by the carriage 12 to reach its right-hand terminal position, the carriage 12 is thrust back by the stop 42 and regains the position shown in FIG. 5.

Figure 4:
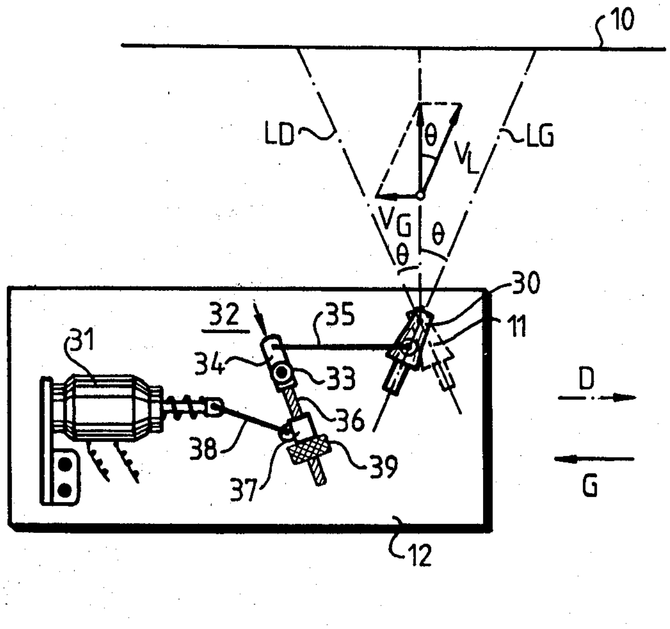
FIG. 4 illustrates a first embodiment of the means utilized to deflect the direction of ejection of the jet of ink.

Thus, in the two embodiments illustrated in FIGS. 4 and 5, the deflection of the jet of ink is obtained simply by deflecting the generator 11 in the direction opposite to that of the displacement of the carriage 12, the directional alignment of the generator being altered at each reversal of the direction of displacement of the carriage.

Figure 6:
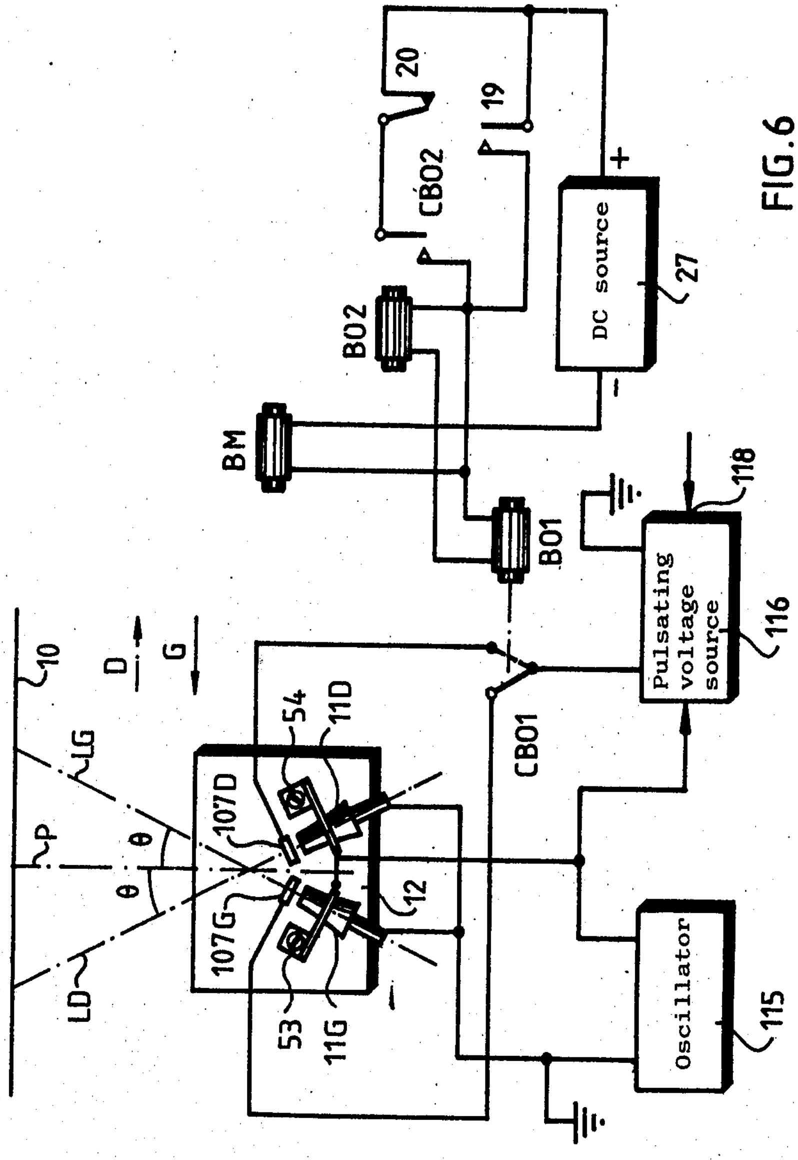
FIG. 6 illustrates a third embodiment of the means utilized to deflect the direction of ejection of the jet of ink.

In the embodiment illustrated in FIG. 6, the printing machine comprises two droplet generators 11G and 11D arranged side-by-side on the carriage 12 and held, by securing means formed by two fastening lugs 53 and 54 attached to the carriage 12, oriented in such a manner that these two generators dispatch two jets of ink along two different directions of discharge LD and LG which correspond to the directions LD and LG mentioned in the foregoing (FIG. 4). These directions LD and LG are symmetrical to each other with respect to the plane P which extends perpendicular to the direction of movement of the carriage and passes between the two generators 11G and 11D. Each of the generators 11G and 11D has allocated to it the corresponding one of the charging electrodes 107G and 107D, each of these electrodes being similar to the charging electrode 107 of FIGS. 1 and 7. Together, generators 11G and 11D may be considered as constituting an ink discharging means. As a simplification FIG. 6 does not illustrate the deflector plates which like the plates 111 and 112 of FIGS. 1 and 7 serve to cause the electrostatic deflection of the droplets resulting from the interruption of the jets of ink ejected by the generators 11G and 11D. The printing machine furthermore comprises a means of controlling the selective energization of the charging electrodes 107G and 107D which, in the embodiment of FIG. 5, is formed by a reversing contact CBO1 controlled by a relay coil BO1 and arranged between the charging electrodes 107G and 107D on the one hand and the voltage source 115 on the other hand, this source 115 being that described in the foregoing. The coil BO1 is controlled in the same manner as the coil BO3 of the circuit of FIG. 7, and for this purpose is arranged in parallel on the one hand with the coil BM which serves the purpose of controlling the reversals of the direction of rotation of the motor 18, and on the other hand with the coil BO2 which ensures to maintain the energization of the coils BM and BO1 throughout the period in which the carriage 12 is moved in the direction of the arrow D. FIG. 5 does not illustrate the complete layout for controlling the energization of the motor 18 for the reason that this layout is analogous to that illustrated in FIG. 7. In these circumstances, it will be understood that when the coils BO1, BO2 and BM are de-energized, in other words when the carriage 12 is moved in the direction of the arrow G, the pulsing voltage provided by the voltage source 116 is applied to the charging electrode 107G. Hence, only some of the droplets dispatched by the generator 11*g* are charged and serve the purpose of printing characters on the carrier 10. By contrast, the other droplets discharged by the generator 11G and all the droplets ejected by the generator 11D are not charged nor deflected by the deflector plates and are consequently collected by the trough or droplet recuperator device. When the coils BO1, BO2 and BM are then energized, that is to say when the carriage 12 is moving in the direction of the arrow D, the pulsing voltage supplied by the source 115 is applied to the charging electrode 107D. In this case, only some of the droplets dispatched by the generator 11D are charged and utilized for printing characters of the carrier 10, whereas the other droplets dispatched by this generator 11D and all the droplets dispatched by the generator 11G are not charged and are consequently collected by the droplet recuperator device.

Figure 2:
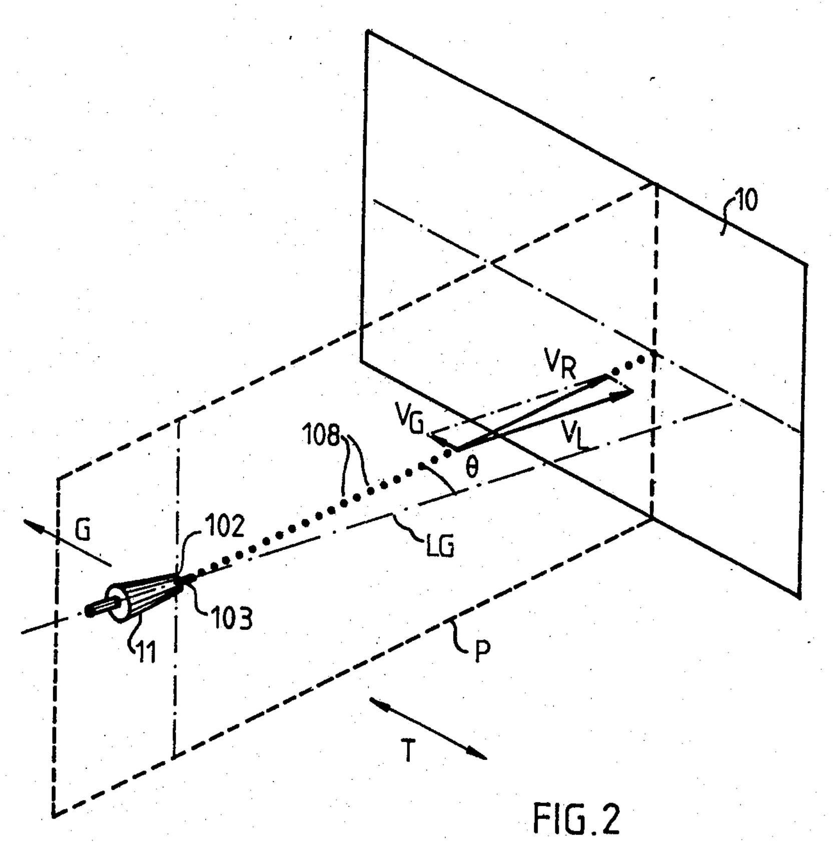
FIG. 2 is a diagrammatic perspective view intended to illustrate the principle of the deflection of the direction of ejection or discharge of the ink jet which is directed towards the record carrier.

FIG. 2 illustrates the effect produced by the ink droplets 108 which are discharged towards the record carrier or paper 10 when the carriage and the generator 11 it bears are driven in one of the two possible directions of movement T. For example, in the direction of the arrow G, the jet of ink 103 which emerges from the orifice of this generator 11 is deflected in the direction opposite to that of movement of the said generator so that it is aligned along the direction LG in the present case. In the carriage were moving in the direction opposite that shown by the arrow G, the direction LD (refer momentarily to FIGS. 4, 5 and 6) would be used instead of LG. This direction LG then forms with the plane P passing through the orifice 102 and which is perpendicular to the direction of movement T, an angle $\theta$ whose value is selected in such a manner as substantially to satisfy the relationship:

$$\tan \theta = (V_G/V_L)$$

in which $V_G$ represents the speed at which the generator 11 is displaced with respect to the record carrier 10, and $V_L$ represents the speed at which the jet of ink 103 is expelled from the orifice 102. Because of this, each droplet is exposed immediately after being formed, to the action of two speeds of which the one $V_L$ is parallel to the direction of discharge LG and the other $V_G$ is parallel to the direction of movement T. By slanting the generator 11 at an angle $\theta$ (FIGS. 4, 5 or 6) or by deflecting the ink jet at the same angle $\theta$ (embodiment of FIGS. 1 and 7), the angle $\theta$ forming this direction LG with the plane P, the resultant $V_R$ of these two speeds $V_L$ and $V_G$ is substantially contained within this plane P. In other words, the droplets 108 are displaced, as is apparent from FIG. 2, along a direction perpendicular to the direction of movement T. In the same way, it would be apparent that if the carriage were displaced in the direction of the arrow D, an analogous result would be obtained by deflecting the jet of ink 103 in such manner that it is aligned in the direction LD.

Figure 3:
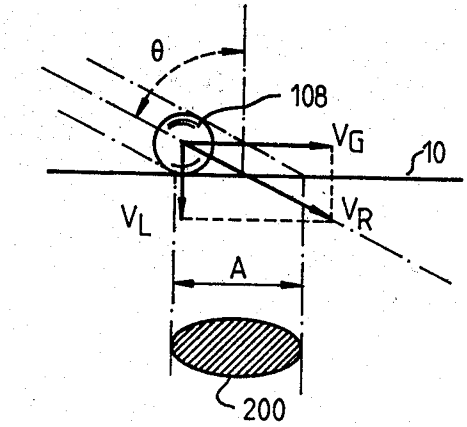
FIG. 3 is a view showing the effect of spreading of the droplets upon impinging on the record carrier, in the case in which the direction of ejection of the jet of ink is not deflected in accordance with the invention.

FIG. 3 shows the spreading effect of the spots which the droplets 108 would cause upon striking the paper or record carrier 10, if the direction of discharge of the jet of ink dispatched by the generator 11 were not to be deflected in accordance with the proceeding statements. In this case, a droplet 108 reaching the record carrier 10 at an angle of incidence $\theta$, spreads out upon arriving on this carrier and thus produces an elongated spot 200 of substantially elliptical shape, of which the major axis has the value:

$$A=(d)/(\cos\theta)$$

d representing the measure of the diameter of the droplet 108.

By contrast, in the case of the invention, each droplet is moved in a direction perpendicular to the plane of the printing medium or record carrier 10 and consequently reaches the same under an angle of incidence ($\theta$ in FIG. 2) with is substantially zero. The movement of the ink generator relative to the paper is compensated for by imparting ink droplets with a velocity component in the direction opposite the movement of the ink generator. In this case, each droplet, upon striking the paper, produces a spot of which the shape is practically circular. Because of this, the characters formed by the total of these spots appear clear in practice.

The invention is obviously not limited to the embodiments described and illustrated. On the contrary, it comprises all the means constituting technical equivalents of the means described, as well as their combinations if these are carried out in the true spirit of the invention and employed within the scope of the following claims.

I claim:

1. An ink jet printing device comprising:

means for discharging ink towards a printing medium in a series of droplets, said ink jet discharging means including at least a first ink generator having an orifice for discharging at least some of the droplets in the series, driving means for providing relative movement between the ink discharging means and the printing medium along a first predetermined direction of movement parallel to the printing medium, said driving means being operative to provide relative movement between the ink discharging means and the printing medium along said first predetermined direction alternating with relative movement along a second predetermined direction, means for compensating for the relative movement between the ink discharging means and the printing medium by imparting at least some of the droplets in the series with a velocity component in a direction opposite the direction of relative movement between the ink discharging means and the printing medium when said relative movement is along said first predetermined direction and when said relative movement is along said second predetermined direction, said ink jet discharging means being mounted on a carriage movable along said first and second predetermined directions, said discharging means being aligned along a plane perpendicular to said predetermined directions, and the means for compensating comprising first and second deflecting electrodes mounted on said carriage and disposed proximate the orifice of said ink generator and on opposite sides of a discharge path of said series of droplets, and means for selectively and alternately energizing said electrodes with a voltage of instant magnitude, said energizing means being operable to energize the electrode of said deflecting electrodes which, when energized, deflects the ink jet in a direction opposite from the relative movement of the carriage.

2. The device of claim 1 wherein said means for selectively and alternately energizing comprises a relay controlling a contact, said contact alternately supplying said first and second deflecting electrodes with said voltage of constant magnitude, and said relay is energized only when the carriage moves along only one of said first and second predetermined directions.

3. The device of claim 2 wherein said means for compensating operates to insure that any droplets which strike the printing medium have a zero velocity component along, or opposite to, said first predetermined direction at the time of striking the printing medium.

4. An ink jet printing device comprising:

means for discharging ink towards a printing medium in a series of droplets, said ink jet discharging means including at least a first ink generator having an orifice for discharging at least some of the droplets in the series, driving means for providing relative movement between the ink discharging means and the printing medium along a first predetermined direction of movement parallel to the printing medium, said driving means being operative to provide relative movement between the ink discharging means and the printing medium along said first predetermined direction alternating with relative movement along a second predetermined direction, said second predetermined direction being parallel to the printing medium and opposite said first predetermined direction, means for compensating for the relative movement between the ink discharging means and the printing medium by imparting at least some of the droplets in the series with a velocity component in a direction opposite the direction of relative movement between the ink discharging means and the printing medium when said relative movement is along said first predetermined direction and when said relative movement is along said second predetermined direction, said ink jet discharging means further comprising a second ink generator with an orifice for discharging ink droplets, said first and said second ink generators being mounted on a movable carriage along said first predetermined direction and aligned along two directions of discharge which are symmetrical to each other with respect to a plane perpendicular to the first predetermined direction, said driving means repetitively moving said carriage and attached first and second ink generators back and forth between two endpoints, and said means for compensating comprising first and second charging electrodes associated respectively with said first and second ink generators for electrically charging the droplets originating from the associated ink generator, said first and second charging electrodes being attached to said carriage, and means for selectively and alternately energizing said first and second charging electrodes with pulsing voltage, said means for selectively and alternately energizing said electrodes being operable to energize the electrode associated with the ink generator discharging in a direction which, with respect to said plane, is inclined in the opposite direction from the relative movement of the carriage such that the ink jet is inclined in the direction opposite from the relative movement of the carriage.

5. The device of claim 4 wherein said means for compensating operates to insure that any droplets which strike the printing medium have a zero velocity component along, or opposite to, said first predetermined direction at the time of striking the printing medium.

6. The device of claim 5 or 4 wherein said means for selectively and alternately energizing comprises a relay controlling a contact, said contact alternately supplying said first and second electrodes with said pulsing voltage, and said relay is energized only when the carriage moves along only one of said first and second predetermined directions.

* * * * *